US012428969B1

(12) United States Patent
Jalan et al.

(10) Patent No.: US 12,428,969 B1
(45) Date of Patent: Sep. 30, 2025

(54) SEAL ASSEMBLY FOR A GAS TURBINE ENGINE

(71) Applicant: General Electric Company, Cincinnati, OH (US)

(72) Inventors: Prateek Jalan, Bangalore (IN); Steven Douglas Johnson, Milford, OH (US); Rajesh Kumar, Bangalore (IN); Tajinder Singh, Bangalore (IN); Alok Kumar, Bangalore (IN); Lucas Parisot, Boston, MA (US); Jonathan Russell Ratzlaff, Loveland, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/796,888

(22) Filed: Aug. 7, 2024

(51) Int. Cl.
*F01D 11/00* (2006.01)
*F01D 11/06* (2006.01)

(52) U.S. Cl.
CPC ............ *F01D 11/001* (2013.01); *F01D 11/06* (2013.01); *F05D 2240/55* (2013.01)

(58) Field of Classification Search
CPC ...... F01D 11/001; F01D 11/06; F01D 11/025; F01D 11/04; F01D 25/22; F05D 2240/55
See application file for complete search history.

(56) References Cited

U.S. PATENT DOCUMENTS 2,188,856 A 1/1940 Chievitz
5,975,537 A * 11/1999 Turnquist ............... F16J 15/443 277/411
6,719,296 B2 4/2004 Brauer et al.
6,758,477 B2 7/2004 Brauer et al.
6,966,191 B2 * 11/2005 Fukutani .................. F02C 7/06 60/785
8,172,232 B2 * 5/2012 Justak .................. F01D 11/025 277/411
10,428,673 B2 10/2019 Erdmenger et al.
10,494,116 B2 12/2019 Petty, Sr. et al.
10,822,984 B2 * 11/2020 Nishikawa ................ F02C 7/28
10,890,082 B2 1/2021 Hardikar et al.
10,895,324 B2 * 1/2021 Tran ......................... F16J 15/40
10,900,369 B2 1/2021 Gibson et al.
10,900,570 B2 * 1/2021 Bidkar ..................... F16J 15/40
11,371,521 B2 6/2022 Chandramohanan et al.
(Continued)

FOREIGN PATENT DOCUMENTS

CN 206338409 U 7/2017

*Primary Examiner* — Eldon T Brockman
(74) *Attorney, Agent, or Firm* — Dority & Manning, P.A.

(57) ABSTRACT

A gas turbine engine includes a compressor section and a turbine section in axial flow arrangement defining an axially extending, longitudinal centerline, and arranged as a rotor and a stator. A seal assembly defines a primary seal at an interface of the rotor and the stator and separates an inlet plenum from an outlet plenum. The seal assembly includes one or more aspiration conduits fluidly connected to the primary seal. One or more flingers are positioned at least partially between the seal assembly and the inlet plenum that define one or more passageways fluidly connecting the inlet plenum to the one or more aspiration conduits. The flingers are positioned to direct at least a portion of an airflow within the inlet plenum away from the one or more passageways.

20 Claims, 6 Drawing Sheets

(56) References Cited

U.S. PATENT DOCUMENTS

| | | | | |
|---|---|---|---|---|
| 11,680,645 | B2 * | 6/2023 | Bidkar | F16J 15/3448<br>277/411 |
| 12,241,372 | B2 * | 3/2025 | Portune | F02C 7/28 |
| 2005/0132706 | A1 * | 6/2005 | Fukutani | F01D 25/183<br>60/726 |

* cited by examiner

SEAL ASSEMBLY FOR A GAS TURBINE ENGINE

FIELD

The present disclosure relates to a seal assembly for a gas turbine engine.

BACKGROUND

Turbine engines, and particularly gas turbine engines, are rotary engines that extract energy from a flow of working air passing serially through a compressor section, a combustor section, and a turbine section. The compressor and turbine stages comprise axially arranged pairs of rotating blades and stationary vanes. The compressor section, the combustor section, and the turbine section may be disposed in an axial flow arrangement and define at least one rotating element or rotor and at least one stationary component or stator. A seal assembly can be located between the stator and the rotor and be used to reduce leakage fluids between the rotor and stator.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
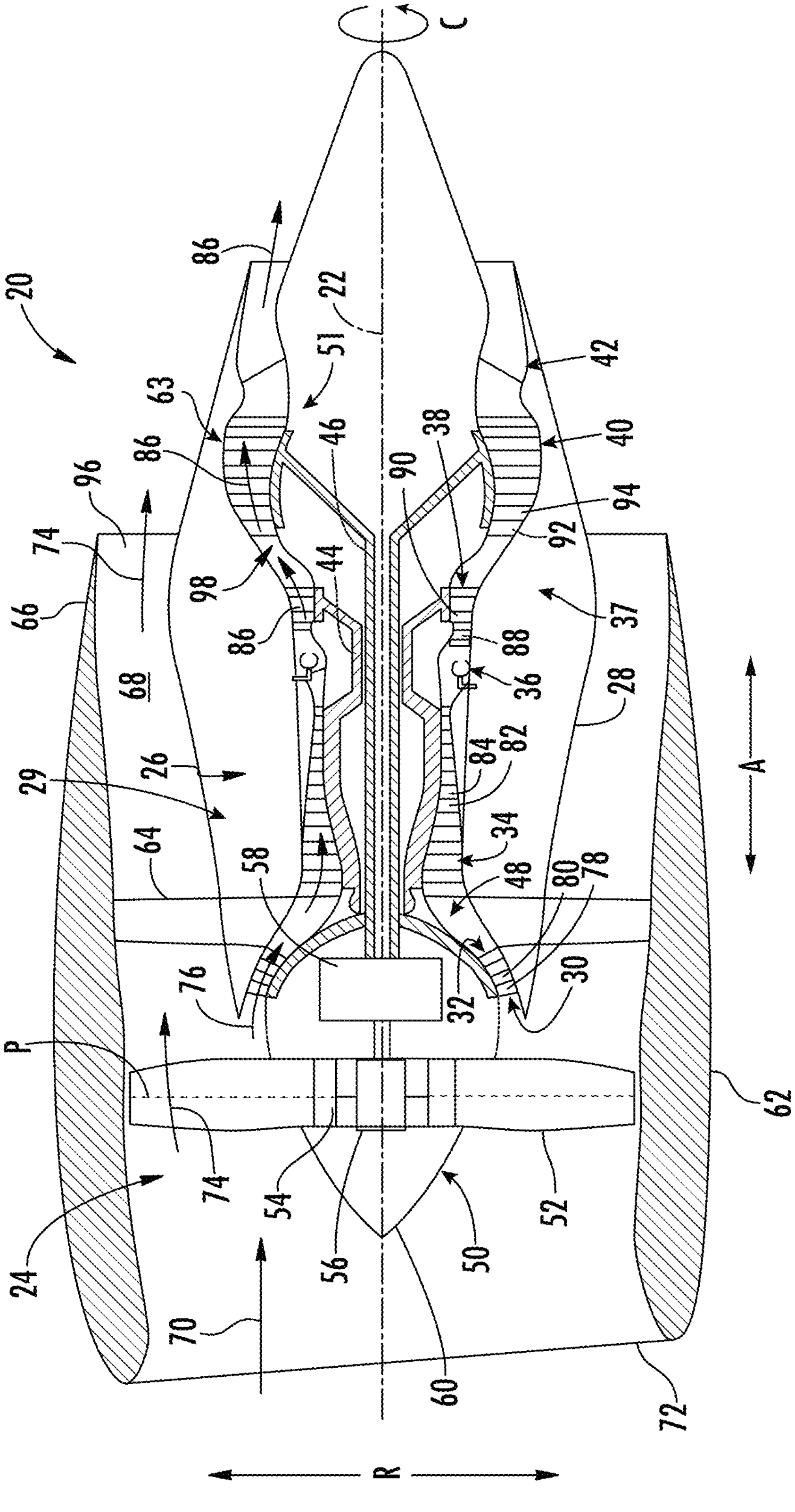
FIG. 1 is a cross-sectional view of an exemplary gas turbine engine in accordance with an exemplary aspect of the present disclosure.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a" "an", and "the" include plural references unless the context clearly dictates otherwise. The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components. Furthermore, the terms "upstream" and "downstream" refer to the relative direction with respect to fluid flow in a fluid pathway. For example, "upstream" refers to the direction from which the fluid flows, and "downstream" refers to the direction to which the fluid flows. The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

The phrases "from X to Y" and "between X and Y" each refers to a range of values inclusive of the endpoints (i.e., refers to a range of values that includes both X and Y).

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

The term "turbomachine" refers to a machine including one or more compressors, a heat generating section (e.g., a combustion section), and one or more turbines that together generate a torque output. The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

As used herein, the term "rotor" refers to any component of a rotary machine, such as a turbine engine, that rotates about an axis of rotation. By way of example, a rotor may include a shaft or a spool of a rotary machine, such as a turbine engine.

As used herein, the term "stator" refers to any component of a rotary machine, such as a turbine engine, that has a coaxial configuration and arrangement with a rotor of the rotary machine. A stator may be disposed radially inward or radially outward along a radial axis in relation to at least a portion of a rotor. Additionally, or in the alternative, a stator may be disposed axially adjacent to at least a portion of a rotor.

Embodiments of the present disclosure include an aspirating seal that provides a non-contacting interface between rotating components, such as at an interface between a stator and a rotor. Such seal assemblies operate at very low interface gaps between the stator and the rotor. The seal assembly includes one or more aspiration conduits that provide a fluid from a plenum to a primary seal area, which may also be referred to as a thin-film seal. To provide tighter interface gaps at the interface of the rotor and the stator, smaller aspiration conduits are needed to control the fluid provided to the primary seal area. However, dust and other particulate matter may clog the aspiration conduits. Embodiments of the present disclosure include one or more flingers located with respect to the aspiration conduits to prevent dust and other particulate matter from entering and/or clogging the aspiration conduits. In exemplary embodiments, a "flinger" is one or more structural components that deflect or force dust or other particulate matter in a particular direction or away from a particular location such as, by way of non-limiting example, utilizing a fluid stream. The flingers may include one or more baffles that direct at least a portion of an airflow feeding the aspiration conduits away from the aspiration conduits such that the redirected airflow carries the dust and particulate matter away from the aspiration conduit due the mass of the dust or particulate matter. In exemplary embodiments, the flinger is configured to cause multiple airflow direction changes before the airflow reaches an entry into the aspiration conduit. In other words, the flinger creates or forms a labyrinth or tortuous path for the airflow before reaching an inlet to the aspiration conduit. Additionally, the flinger also functions as a heat shield to protect the seal assembly from thermal radiation which enables the seal assembly to operate at lower operating gaps between stationary and rotating components due to less distortion of the seal assembly that may result from thermal radiation exposure.

Referring now to the drawings, FIG. 1 is a cross-sectional side view of a gas turbine engine 20 in accordance with an exemplary embodiment of the present disclosure. More particularly, for the embodiment of FIG. 1, the gas turbine engine 20 is a multi-spool, high-bypass turbofan jet engine, sometimes also referred to as a "turbofan engine." As shown in FIG. 1, the gas turbine engine 20 defines an axial direction A (extending parallel to a longitudinal centerline 22 provided for reference), a radial direction R, and a circumferential direction C extending about the longitudinal centerline 22. In general, the gas turbine engine 20 includes a fan section 24 and a turbomachine 26 disposed downstream from the fan section 24.

The exemplary turbomachine 26 depicted generally includes an outer casing 28 that defines an annular core inlet 30. The outer casing 28 at least partially encases, in serial flow relationship, an axial compressor section 29 including a booster or low-pressure (LP) compressor 32 and a high-pressure (HP) compressor 34, a combustion section 36, a turbine section 37 including a high-pressure (HP) turbine 38 and a low-pressure (LP) turbine 40, and a jet exhaust nozzle 42.

A high-pressure (HP) shaft 44 drivingly connects the HP turbine 38 to the HP compressor 34. A low-pressure (LP) shaft 46 that drivingly connects the LP turbine 40 to the LP compressor 32. The LP compressor 32, the HP compressor 34, the combustion section 36, the HP turbine 38, the LP turbine 40, and the jet exhaust nozzle 42 together define a core air flowpath 48 through the gas turbine engine 20. The LP shaft 46 and the HP shaft 44 are rotatable about the longitudinal centerline 22 and couple to a set of rotatable elements, which can collectively define a rotor 51.

For the embodiment depicted, the fan section 24 includes a fan 50 having a plurality of fan blades 52 coupled to a disk 54 in a spaced apart manner. As depicted, the fan blades 52 extend outwardly from disk 54 generally along the radial direction R. Each fan blade 52 is rotatable with the disk 54 about a pitch axis P by virtue of the fan blades 52 being operatively coupled to a suitable pitch change mechanism 56 configured to collectively vary the pitch of the fan blades 52, e.g., in unison.

The gas turbine engine 20 further includes a power gear box 58. The fan blades 52, disk 54, and pitch change mechanism 56 are together rotatable about the longitudinal centerline 22 by the LP shaft 46 across the power gear box 58. The power gear box 58 includes a plurality of gears for adjusting a rotational speed of the fan 50 relative to a rotational speed of the LP shaft 46, such that the fan 50 and the LP shaft 46 may rotate at more efficient relative speeds.

Referring still to the exemplary embodiment of FIG. 1, the disk 54 is covered by rotatable front hub 60 of the fan section 24 (sometimes also referred to as a "spinner"). The front hub 60 is aerodynamically contoured to promote an airflow through the plurality of fan blades 52. Additionally, the exemplary fan section 24 includes an annular fan casing or outer nacelle 62 that circumferentially surrounds the fan 50 and/or at least a portion of the turbomachine 26. The outer nacelle 62 is supported relative to the turbomachine 26 by a plurality of circumferentially spaced struts or outlet guide vanes 64 in the embodiment depicted. Moreover, a downstream section 66 of the outer nacelle 62 extends over an outer portion of the turbomachine 26 to define a bypass airflow passage 68 therebetween.

It should be appreciated, however, that the exemplary gas turbine engine 20 depicted in FIG. 1 is provided by way of example only, and that in other exemplary embodiments, the gas turbine engine 20 may have other configurations. Additionally, or alternatively, although the gas turbine engine 20 depicted is configured as a geared gas turbine engine (e.g., including the power gear box 58) and a variable pitch gas turbine engine (e.g., including a fan 50 configured as a variable pitch fan), in other embodiments, the gas turbine engine 20 may be configured as a direct drive gas turbine engine (such that the LP shaft 46 rotates at the same speed as the fan 50), as a fixed pitch gas turbine engine (such that the fan 50 includes fan blades 52 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

During operation of the gas turbine engine 20, a volume of air 70 enters the gas turbine engine 20 through an associated inlet 72 of the outer nacelle 62 and fan section 24. As the volume of air 70 passes across the fan blades 52, a first portion of air 74 is directed or routed into the bypass airflow passage 68 and a second portion of air 76 is directed or routed into the core air flowpath 48, or more specifically into the LP compressor 32. The ratio between the first portion of air 74 and the second portion of air 76 is commonly known as a bypass ratio.

As the second portion of air 76 enters the LP compressor 32, one or more sequential stages of low-pressure (LP) compressor stator vanes 78 and low-pressure (LP) compressor rotor blades 80 coupled to the LP shaft 46 progressively compress the second portion of air 76 flowing through the LP compressor 32 enroute to the HP compressor 34. Next, one or more sequential stages of high-pressure (HP) compressor stator vanes 82 and high-pressure (HP) compressor rotor blades 84 coupled to the HP shaft 44 further compress the second portion of air 76 flowing through the HP compressor 34. This provides compressed air to the combustion section 36 where it mixes with fuel and burns to provide combustion gases 86.

The combustion gases 86 are routed through the HP turbine 38 where a portion of thermal and/or kinetic energy from the combustion gases 86 is extracted via sequential stages of high-pressure (HP) turbine stator vanes 88 that are coupled to a turbine casing and high-pressure (HP) turbine rotor blades 90 that are coupled to the HP shaft 44, thus causing the HP shaft 44 to rotate, thereby supporting operation of the HP compressor 34. The combustion gases 86 are then routed through the LP turbine 40 where a second portion of thermal and kinetic energy is extracted from the combustion gases 86 via sequential stages of low-pressure (LP) turbine stator vanes 92 that are coupled to a turbine casing and low-pressure (LP) turbine rotor blades 94 that are coupled to the LP shaft 46, thus causing the LP shaft 46 to rotate, and thereby supporting operation of the LP compressor 32 and/or rotation of the fan 50. Complementary to the rotor 51, the stationary portions of the gas turbine engine 20, such as the LP compressor stator vanes 78, the HP compressor stator vanes 82, the HP turbine stator vanes 88, and the LP turbine stator vanes 92, are also referred to individually or collectively as a stator 63. As such, the stator 63 can refer to the combination of non-rotating elements throughout the gas turbine engine 20.

The combustion gases 86 are subsequently routed through the jet exhaust nozzle 42 of the turbomachine 26 to provide propulsive thrust. Simultaneously, the pressure of the first portion of air 74 is substantially increased as it is routed through the bypass airflow passage 68 before it is exhausted from a fan nozzle exhaust section 96 of the gas turbine engine 20, also providing propulsive thrust. The HP turbine 38, the LP turbine 40, and the jet exhaust nozzle 42 at least partially define a hot gas path 98 for routing the combustion gases 86 through the turbomachine 26.

Figure 2:
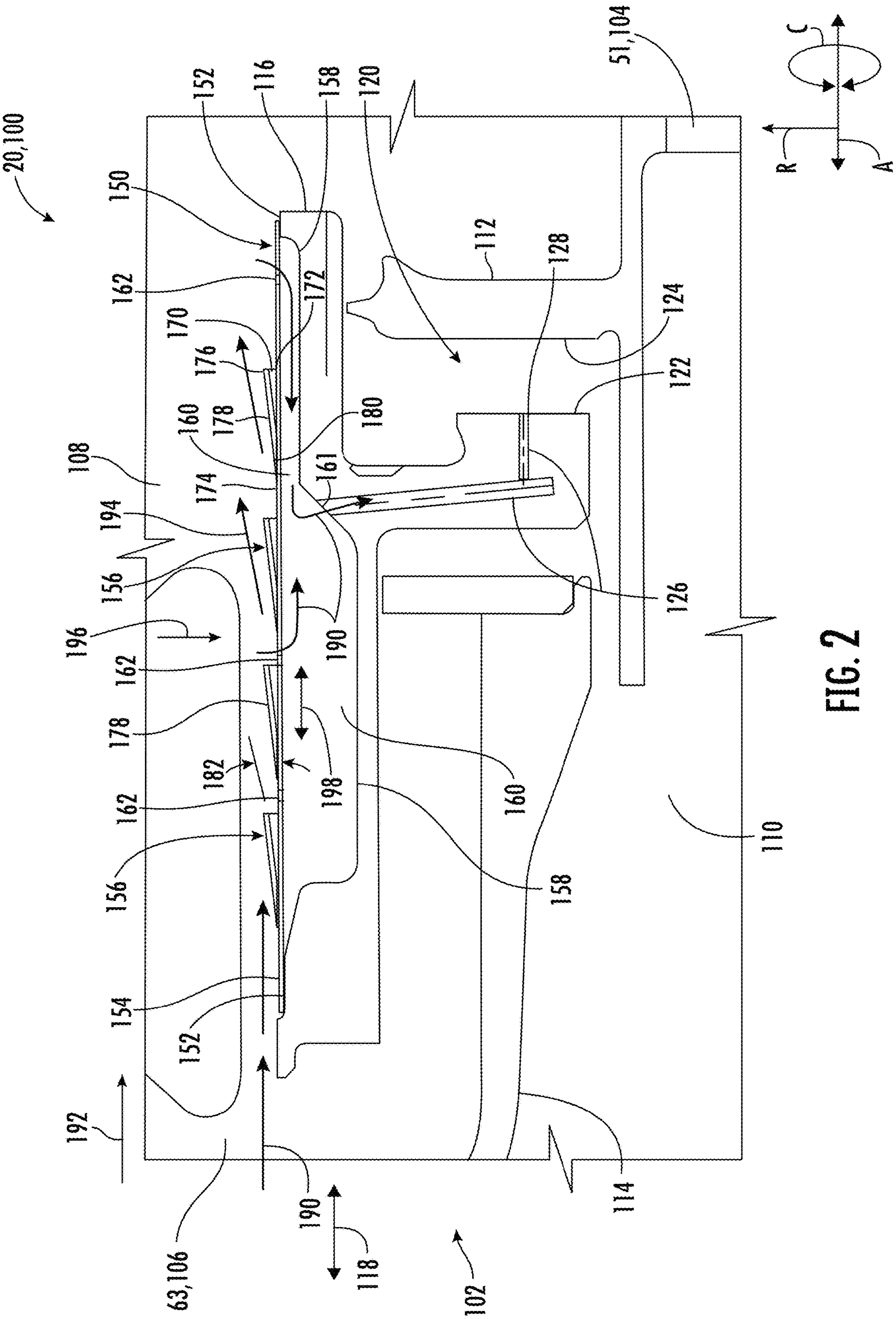
FIG. 2 is schematic perspective diagram of a seal assembly in accordance with an exemplary aspect of the present disclosure.

FIG. 2 depicts a rotary machine 100, such as the gas turbine engine 20, including a seal assembly 102 configured to provide a seal interface with a rotor 104, such as between the rotor 104 and a stator 106 of the rotary machine 100. The seal assembly 102 may be integrated into any rotary machine, such as at an interface between the rotor 51 and the stator 63 of the gas turbine engine 20 as described with reference to FIG. 1. As shown in FIG. 2, the seal assembly 102 may separate an inlet plenum 108 from an outlet plenum 110. The inlet plenum 108 may define a region of the rotary machine 100 that includes a relatively higher-pressure fluid volume. The outlet plenum 110 may define a region of the rotary machine 100 that includes a relatively lower-pressure fluid volume. The seal assembly 102 may have an annular configuration. In some embodiments, the seal assembly 102 may include a plurality of annular elements that may be assembled to provide the seal assembly 102. Additionally, or in the alternative, the seal assembly 102 may include a plurality of semi-annular elements that may be assembled to provide the seal assembly 102 that has an annular configuration.

In exemplary embodiments, the seal assembly 102 may be configured as an aspirating seal that provides a non-contacting seal interface that inhibits contact between the stator 106 and the rotor 104. By way of non-limiting example, the seal assembly 102 may include or may be configured as an aspirating face seal, a fluid bearing, a gas bearing, or the like. During operation, a fluid within the inlet plenum 108 may flow, e.g., aspirate, through one or more pathways of the seal assembly 102 to the outlet plenum 110. The fluid flow may provide for the non-contacting seal interface. In some embodiments, the fluid may include pressurized air, gasses, and/or vapor. In other embodiments, the fluid may include a liquid.

As shown, a seal assembly 102 may be disposed adjacent to the rotor 104. Further, as shown, the seal assembly 102 may include a seal rotor 112, a seal stator 114, and a seal slider 116. The seal rotor 112 may be coupled to the rotor 104. In exemplary embodiments, the seal stator 114 may be coupled to a stationary portion of the gas turbine engine 20. The seal slider 116 may be slidably coupled to the seal stator 114 to enable axial translatable movement of the seal slider 116 with respect to the seal stator 114 in the directions 118. The seal rotor 112, the seal stator 114, and/or the seal slider 116 may respectively have an annular configuration. Additionally, or in the alternative, the seal rotor 112, the seal stator 114, and/or the seal slider 116 may respectively include a plurality of semi-annular elements that may be assembled to provide an annular assembly. The seal assembly 102 includes a primary seal 120. The primary seal 120 may include or may be configured as an aspirating face seal, a fluid bearing, a gas bearing, or the like. The primary seal 120 may have an annular configuration defined by one or more annular or semi-annular components, such as the seal slider 116 and/or the seal rotor 112.

The seal slider 116 may include a slider face 122. The seal rotor 112 may include a rotor face 124. The primary seal 120 may be defined at least in part by the slider face 122 of the seal slider 116 and the rotor face 124 of the seal rotor 112. The slider face 122 and the rotor face 124 may provide a non-contacting interface that defines the aspirating face seal, fluid bearing, gas bearing, or the like, of the primary seal 120. The seal slider 116 may be configured to slidably engage and retract the slider face 122 with respect to the rotor face 124. In exemplary embodiments, the seal slider 116 may include one or more aspiration conduits 126 configured to supply fluid from the inlet plenum 108 to the primary seal 120. The aspiration conduits 126 may define an internal conduit, pathway, or the like that passes through the seal slider 116. The aspiration conduits 126 may fluidly communicate with the inlet plenum 108 and the primary seal 120. The aspiration conduits 126 may discharge fluid from the inlet plenum 108 to the primary seal 120, for example, at a plurality of openings 128 in the slider face 122.

During operation, the seal slider 116 may slide forward and aft relative to the seal stator 114 and the seal rotor 112. Movement of the seal slider 116 may be initiated at least in part due to a pressure difference between the inlet plenum 108 and the outlet plenum 110. By way of example, FIG. 2 depicts the seal slider 116 in a retracted position such that the primary seal 120 is relatively open. The seal slider 116 may occupy a retracted position, for example, when the rotary machine 100 operates at idle. As the power output and/or rotational speed increases, the seal slider 116 may slide towards the seal rotor 112, for example, as the pressure differential increases between the inlet plenum 108 and the outlet plenum 110. The seal slider 116 may occupy an engaged position, for example, when the rotary machine 100 operates at nominal operating conditions and/or at rated operating conditions. With the seal slider 116 is in an engaged position, the slider face 122 and the rotor face 124 come into close proximity, while fluid flow from the inlet plenum 108 to the outlet plenum 110, such as through the plurality of aspiration conduits 126 may define an aspirating face seal, a fluid bearing, a gas bearing, or the like, that provides a non-contacting interface between the slider face 122 and the rotor face 124.

In the illustrated embodiment, one or more flingers 150 are coupled to a surface 152 of the seal slider 116 facing toward the inlet plenum 108. The flingers 150 may have an annular configuration. Additionally, or in the alternative, the flingers 150 may include a plurality of semi-annular elements that may be assembled to provide an annular assembly. In other words, the flinger 150 may extend circumferentially about an entirety of the stator 63. Additionally or alternatively, the flinger 150 may extend for a particular circumferential span that is less than the entire circumferential distance of the stator 63. In other words, a plurality of discrete, semi-annular flingers 150 may spaced apart from each other circumferentially about the stator 63. In exemplary embodiments, the flingers 150 include a base member 154 coupled to the seal slider 116 and one or more baffles 156 coupled to the base member 154 and extending radially outward toward and into the inlet plenum 108. A “baffle” as used herein refers to a device used to control the flow of a fluid or loose material in a particular direction. It should be understood that the base member 154 and the baffles 156 may be configured as a unitary or integral component. The base member 154 may be coupled to the seal slider 116 by a brazed interface, using bolts or other suitable fasteners, or other suitable attachment mechanisms. In exemplary embodiments, the flinger 150 is positioned with respect to the seal slider 116 to define one or more passageways 160 between the flinger 150 and an inlet 161 of the aspiration conduit 126. In exemplary embodiments, the base member 154 is positioned and/or coupled to the seal slider 116 to define the one or more passageways 160 between the base member 154 and the seal slider 116. In the illustrated embodiment, the seal slider 116 includes one or more recesses 158 disposed radially inward with respect to the surface 152 such that the one or more passageways 160 are defined between the flinger 150 and the seal slider 116. The one or more passageways 160 are fluidly connected with the aspiration conduits 126.

In FIG. 2, the base member 154 also defines one or more passageways 162 extending therethrough to fluidly connect the inlet plenum 108 with the passageway 160. Thus, in exemplary embodiments, a combination of the passageways 160 and 162 provide fluid communication between the inlet plenum 108 and the aspiration conduits 126. In the embodiment depicted in FIG. 2, the one or more baffles 156 are wedge-shaped or ramp-shaped baffles. In other words, the baffle 156 includes a portion 170 having an end 172 coupled to a surface 174 of the base member 154 facing the inlet plenum 108, and the portion 170 has an end 176 disposed distal to the end 172 and positioned radially outward from the surface 174. At least a portion of the surface 174 defines a radially inward boundary of the inlet plenum 108. The baffle 156 also includes a portion 178 having an end 180 coupled to the surface 174 and axially spaced apart from the end 172. The portion 178 extends axially from the end 180 to the end 176. The portion 178 extends at a radially outward angle with respect to the surface 174 from the end 180 to the end 176 of the portion 170. In the illustrated embodiment, the baffles 156 include a plurality of baffles 156 axially spaced apart from each other. Respective axially-located baffles 156 may have an annular configuration. Additionally, or in the alternative, respective axially-located baffles 156 may include a plurality of semi-annular elements that may be assembled to provide an annular assembly. In other words, each axially-located baffle 156 may extend circumferentially about an entirety of the stator 63. Additionally or alternatively, each axially-located baffle 156 may extend for a particular circumferential span that is less than the entire circumferential distance of the stator 63. In other words, a plurality of baffles 156 may be spaced apart from each other circumferentially about the stator 63.

In exemplary embodiments, the portion 178 is disposed at an angle 182 that is at least 2° with respect to the surface 174. In exemplary embodiments, the portion 178 is disposed at an angle 182 that is in a range from about 2° to about 10° with respect to the surface 174. As depicted in FIG. 2, the one or more passageways 162 are located downstream from at least one baffle 156 of the one or more baffles 156. In the embodiment depicted in FIG. 2, an airflow 190 within the inlet plenum 108 flows in an axial direction, indicated by a direction 192 in FIG. 2, as the airflow approaches the seal assembly 102. As the airflow 190 reaches the baffles 156, the baffles 156 cause at least a portion of the airflow 190 to be deflected in a direction away from an inlet of the one or more passageways 162 to direct or “fling” dust or other particulate matter away from an inlet of the one or more passageways 162 such as, by way of non-limiting example, via the centrifugal force or force of the airflow 190 in a direction away from an inlet of the one or more passageways 162. In the illustrated embodiment, as the airflow 190 reaches the baffles 156, the baffles 156 cause at least a portion of the airflow 190 to be directed radially outward, indicated by the direction 194. In other words, the portion 178 causes at least a portion of the airflow 190 to be directed radially outward before the airflow 190 reaches at least one of the passageways 160 or 162. In the illustrated embodiment, the passageways 162 are formed to direct the airflow 190 from the inlet plenum 108 in a direction 196 into the passageway 160. In the illustrated embodiment, the direction 196 corresponds to a radial direction. In other words, the airflow 190 from the inlet plenum 108 flows radially inward from the inlet plenum 108 through the passageways 162 into the passageway 160. The airflow 190 within the passageway 160 flows at least partially in directions 198 from a respective passageway 162 toward the aspiration conduits 126 and enters the aspiration conduits 126. In the illustrated embodiment, the directions 198 correspond to an axial direction. In exemplary embodiments, as the airflow 190 enters the passageways 162 from the inlet plenum 108, the flow direction of the airflow 190 changes by at least 90°. In other words, an angular difference between the direction 194 and the direction 196 is at least 90°. Additionally, in exemplary embodiments, after the airflow 190 flows through the passageway 162, the direction of the airflow 190 changes by at least another 90°. In other words, an angular difference between the direction 196 and the directions 198 is at least 90°. Accordingly, in exemplary embodiments, the flinger 150 causes the airflow 190 to make two directional changes of at least 90° each before reaching the aspiration conduits 126. Thus, in exemplary embodiments, the flinger 150 causes the airflow 190 to undergo a total of at least 180° of directional change between the inlet plenum 108 and the aspiration conduits 126 (e.g., at least two 90° direction changes that result in the airflow 190 flowing in the same direction as the flow direction in the inlet plenum 108 before reaching the aspiration conduits 126, or at least two 90° direction changes that result in the airflow 190 flowing in a reverse direction as the flow direction in the inlet plenum 108 before reaching the aspiration conduits 126).

In exemplary embodiments, the flinger 150 reduces or substantially prevents dust and other particulate matter from entering and potentially clogging the aspiration conduits 126. In operation, the baffles 156 cause a directional change of the airflow 190 radially outward away from the passageways 162 such that a flow velocity of the airflow 190 causes dust or other particulate matter to be directed away from the passageways 162 due to the mass of the dust or other particulate matter. In the illustrated embodiment, the flinger 150 may include a plurality of passageways 162 spaced axially apart from each other such that each passageway 162 is located downstream from at least one of the baffles 156. Additionally or alternatively, one or more portions of the base member 154 may be in the form of a mesh structure to define the one or more passageways 162. Further, in the illustrated embodiment, the portion 178 is depicted as having a substantially planar geometry; however, it should be understood that the portion 178 may alternatively or additionally be curved or have one or more curved portions.

Figure 3A:
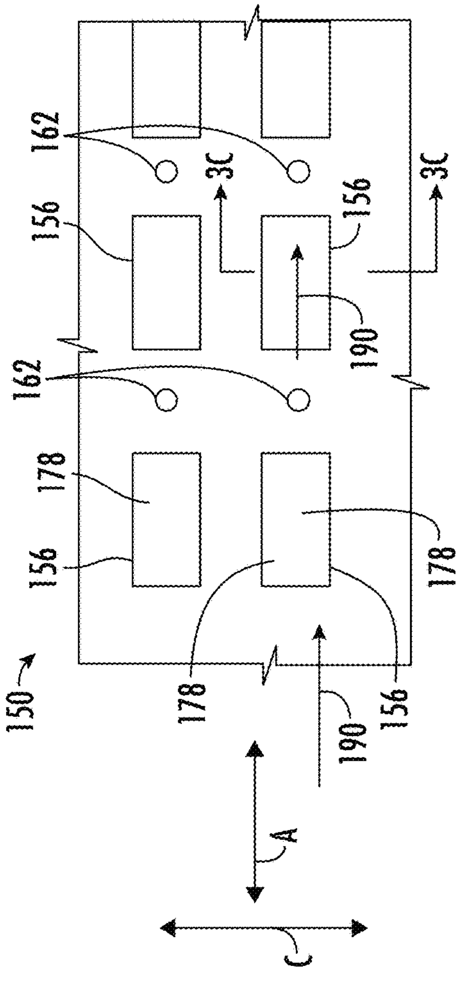
FIG. 3A is schematic plan view of a portion of the seal assembly of FIG. 2 in accordance with an exemplary aspect of the present disclosure.
Figure 3C:
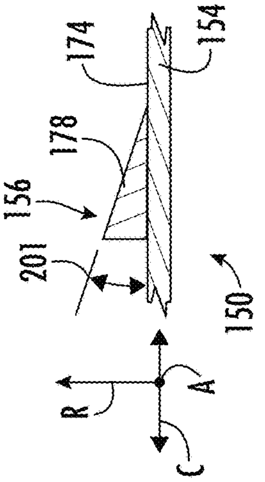
FIG. 3C depicts a schematic section view of at least a portion of a flinger in accordance with an exemplary aspect of the present disclosure depicted in FIG. 3A taken along the line 3C-3C of FIG. 3A.
Figure 3B:
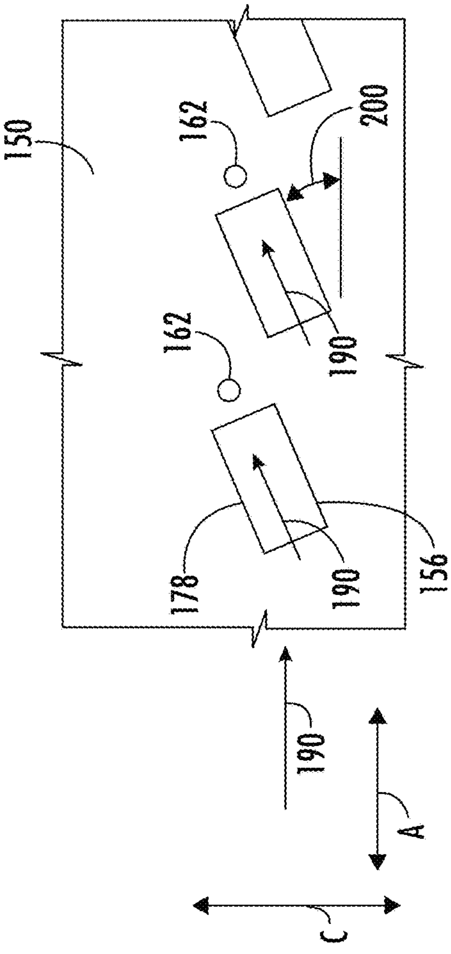
FIG. 3B is schematic plan view of a portion of the seal assembly of FIG. 2 in accordance with another exemplary aspect of the present disclosure.

FIGS. 3A and 3B depict partial plan views of at least a portion of the flinger 150. In the embodiment depicted in FIG. 3A, the baffles 156 are positioned such that they are spaced apart from each other axially and in a row in substantial alignment with the axial direction. In the embodiment depicted in FIG. 3B, the baffles 156 may additionally or alternatively be oriented at an angle 200 with respect to the axial direction to create a swirling flow of the airflow 190 within the inlet plenum 108 (FIG. 2) having at least a circumferential direction component. In exemplary embodiments, the angle 200 may be from about 0° to about 70° with respect to the axial direction. In exemplary embodiments, the angle 200 may be in a range from about 30° to about 70° with respect to the axial direction. FIG. 3C depicts a schematic section view of at least a portion of the flinger 150 depicted in FIG. 3A taken along the line 3C-3C of FIG. 3A. As illustrated in FIG. 3C, the portion 178 may also vary radially across a circumferential span of the baffle 156 to create a swirling flow of the airflow 190 (FIG. 2) having at least a circumferential direction component. In exemplary embodiments, the portion 178 be oriented at an angle 201 with respect to the radial direction to create a swirling flow of the airflow 190 (FIG. 2) within the inlet plenum 108 (FIG. 2) having at least a circumferential direction component. In exemplary embodiments, the angle 201 may be in a range from about 30° to about 70° with respect to the surface 174 of the base member 154 such that the portion 178 extends radially outward circumferentially at a particular axial location.

Figure 4:
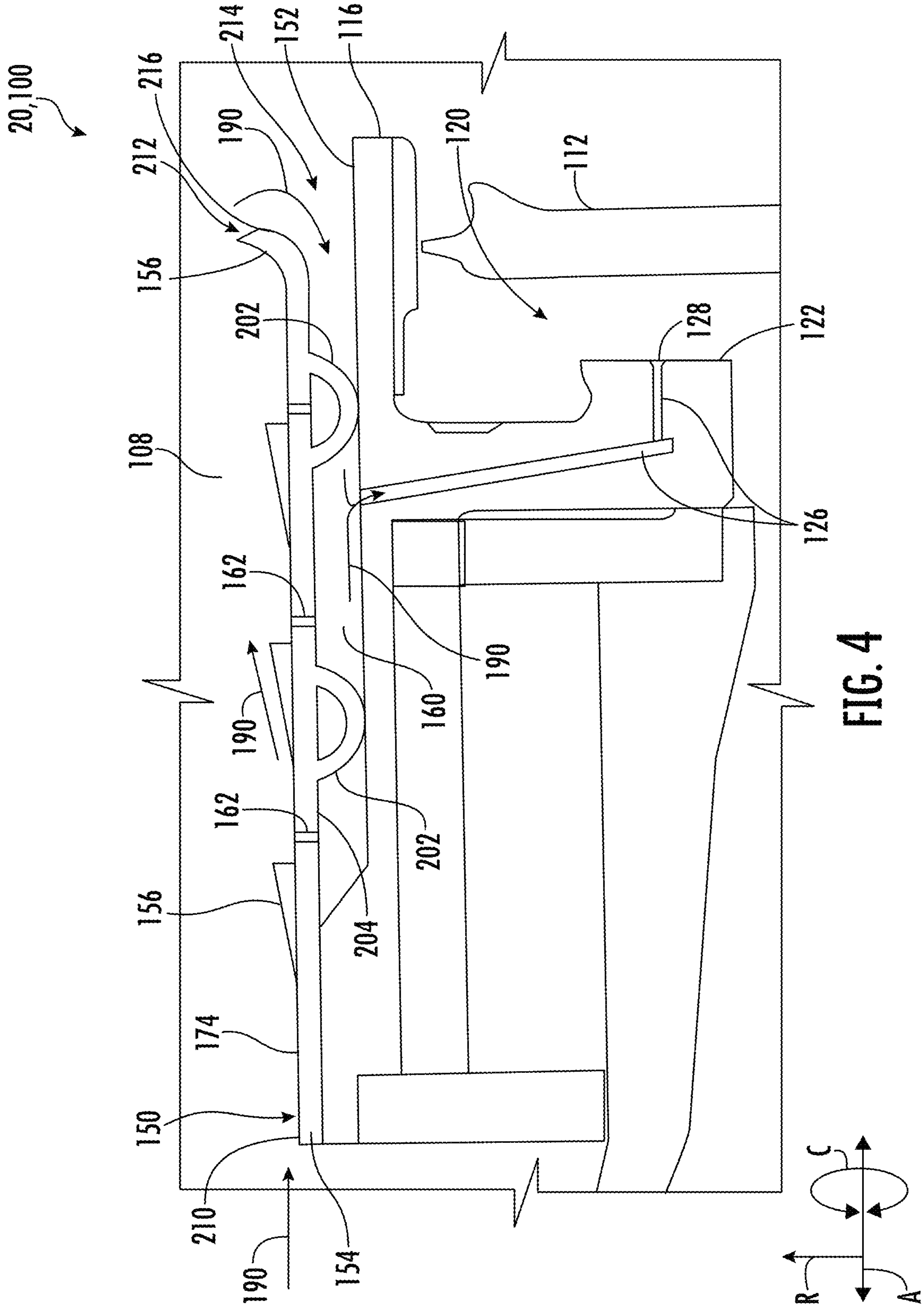
FIG. 4 is schematic perspective diagram of a seal assembly in accordance with an exemplary aspect of the present disclosure.

FIG. 4 depicts another embodiment of the flinger 150 according to the present disclosure. The flinger 150 of FIG. 4 may configured the same as the flinger 150 depicted in FIGS. 2, 3A, and 3B, and the same or similar reference numerals may refer to the same or similar parts. In the embodiment illustrated in FIG. 4, the flinger 150 includes one or more tabs 202 extending radially inward from a surface 204 of the base member 154 facing radially inward toward the seal slider 116. The one or more tabs 202 are configured to maintain a substantially uniform passageway 160 between the radially outward facing surface 152 of the seal slider 116 and the radially inward facing surface 204 of the flinger 150. The one or more tabs 202 may include a plurality of tabs 202 spaced apart from each other in the axial direction. The one or more tabs 202 may have an annular configuration. Additionally, or in the alternative, respective axially-located tabs 202 may include a plurality of semi-annular elements that may be assembled to provide an annular assembly. In other words, each axially-located tab 202 may extend circumferentially about an entirety of the stator 63. Additionally or alternatively, each axially-located tab 202 may extend for a particular circumferential span that is less than the entire circumferential distance of the stator 63.

In FIG. 4, the flinger 150 has an end 210 coupled to the seal slider 116 and an end 212 located distal to and downstream from the end 210. In exemplary embodiments, the end 212 is a freestanding end disposed spaced apart radially from at least a portion of the seal slider 116. The freestanding configuration of the end 212 forms an inlet 214 into the passageway 160 for the airflow 190 from the inlet plenum 108. Thus, in exemplary embodiments, the airflow 190 may enter the passageway 160 via the one or more passageways 162 and/or the inlet 214. In the illustrated embodiment, the end 212 also includes a baffle 156 in the form of a lip 216 that extends radially outward away from the seal slider 116. The lip 216 may be curved or have a planar angular surface, or both. The lip 216 also causes the airflow 190 flowing within the inlet plenum 108 to be directed radially outward to impel dust or other particulate matter radially away from the inlet 214 before the airflow 190 enters the inlet 214.

In exemplary embodiments, the flinger 150 also shields the seal assembly 102 from thermal radiation emitted from various components of the gas turbine engine 20. In exemplary embodiments, the seal assembly 102 may be located in close proximity to radiative heat flow from components of the gas turbine engine 20 such as, by way of non-limiting example, various stages of the LP turbine 40 (FIG. 1). The thermal radiation effect on the seal slider 116 and the seal rotor 112 may cause large temperature gradients which can correspondingly cause deflections or coning of seal interface surfaces. The potential deflections or coning of the seal interface surfaces may necessitate that higher operating clearances be maintained between the seal interface surfaces. Embodiments of the present disclosure utilize the flinger 150 as a heatshield to protect the seal slider 116 from thermal radiation effects enabling the seal assembly 102 to operate at lower operating gaps between seal interface surfaces.

Figure 5A:
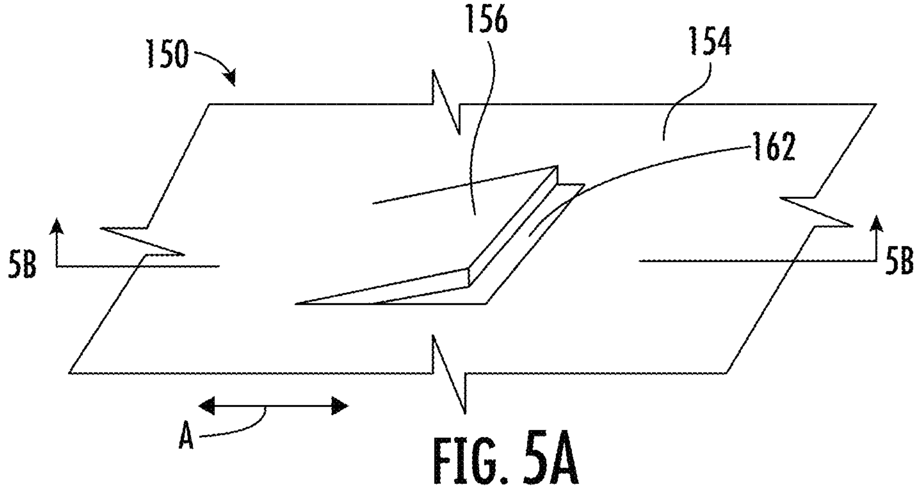
FIG. 5A is a schematic perspective diagram at least a portion of a flinger in accordance with an exemplary aspect of the present disclosure.
Figure 5B:
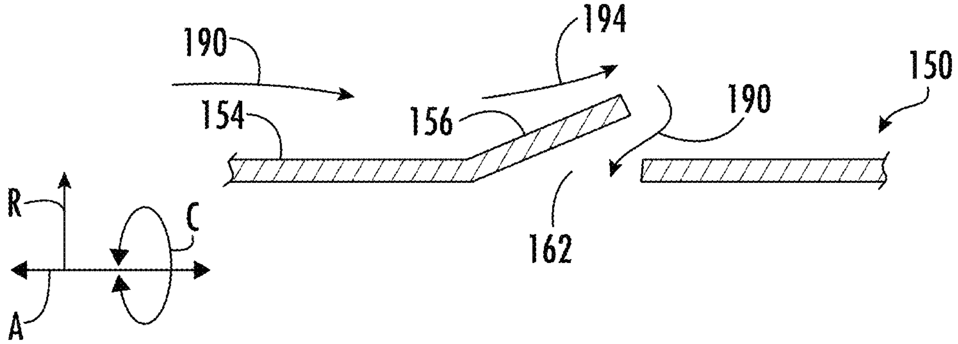
FIG. 5B depicts a schematic section view of at least a portion of a flinger in accordance with an exemplary aspect of the present disclosure depicted in FIG. 5A taken along the line 5B-5B of FIG. 5A.

FIG. 5A is a schematic perspective diagram at least a portion of an embodiment of the flinger 150 in accordance with an exemplary aspect of the present disclosure, and FIG. 5B depicts a schematic section view of at least a portion of the flinger 150 depicted in FIG. 5A in accordance with an exemplary aspect of the present disclosure taken along the line 5B-5B of FIG. 5A. Referring to FIGS. 5A and 5B, in the illustrated embodiment, the one or more baffles 156 are formed from the base member 154 such as, by way of non-limiting example, via a stamping process such that a portion of the base member 154 is cut and bent radially outward to form the one or more baffles 156 while also producing the one or more passageways 162 in the flinger 150 in the location of the base member 154 where the baffle 156 is formed. Thus, in exemplary embodiments, the one or more passageways 162 are located below or radially inward from the baffle 156. Accordingly, in exemplary embodiments, at least a portion of the airflow 190 flows axially aft and is directed radially outward by the baffle 156, such as in the direction 194, before passing through the passageway 162. In the illustrated embodiment, at least a portion of the airflow 190 reverses direction and flows axially forward to flow through the passageway 162. Thus, the baffle 156, alone or in combination with the change in flow direction of the airflow 190, impel dust or other particulate matter radially away from the passageway 162 before the airflow 190 enters the passageway 162.

Figure 6:
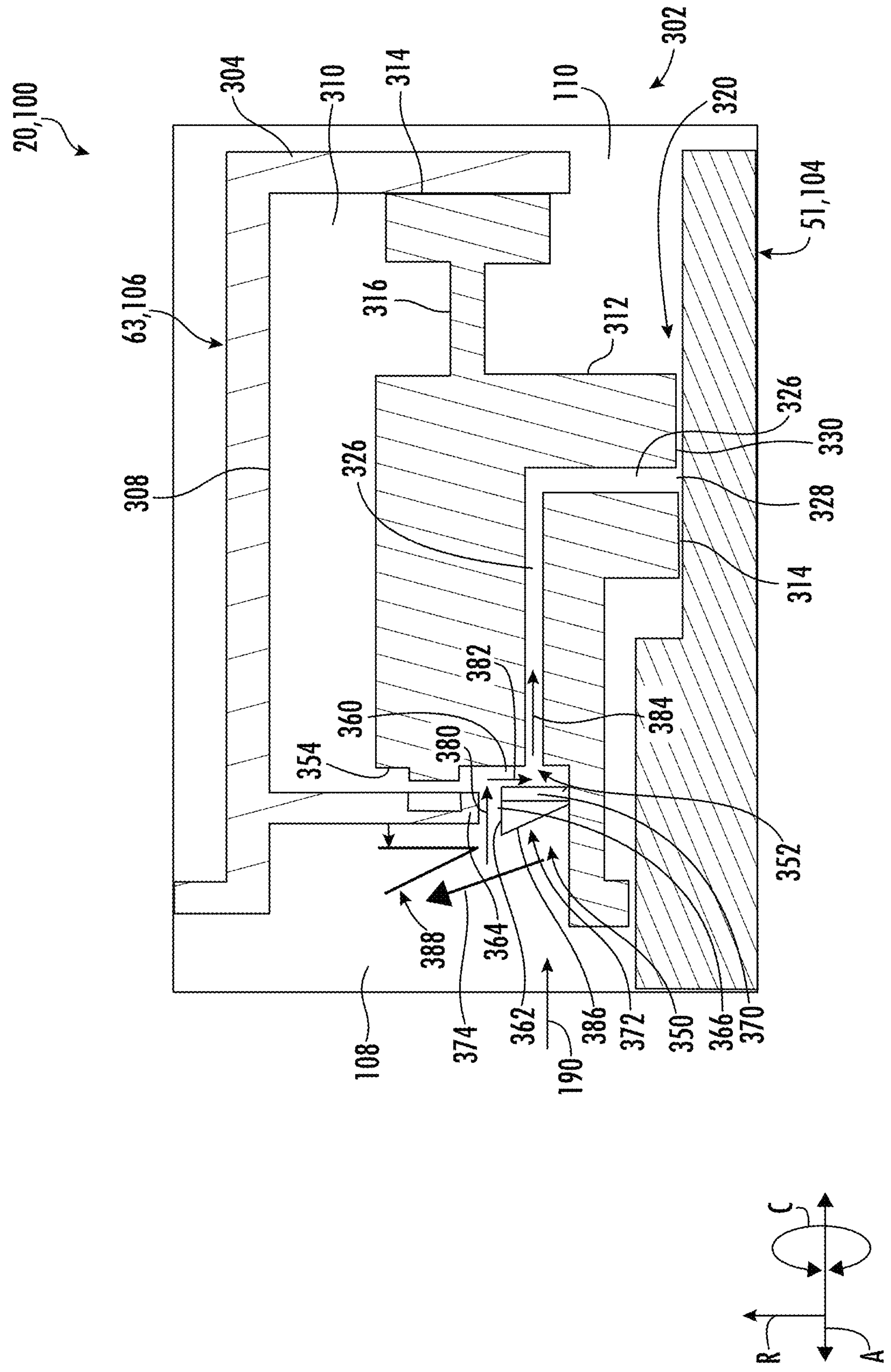
FIG. 6 is a schematic perspective diagram of a seal assembly in accordance with an exemplary aspect of the present disclosure.

FIG. 6 depicts the rotary machine 100, such as the gas turbine engine 20, including a seal assembly 302 configured to provide a seal interface with the rotor 104, such as between the rotor 104 and the stator 106 of the rotary machine 100. The seal assembly 302 may be integrated into any rotary machine, such as at an interface between the rotor 51 and the stator 63 of the gas turbine engine 20 as described with reference to FIG. 1. As shown in FIG. 6, the seal assembly 302 may separate the inlet plenum 108 from the outlet plenum 110. The inlet plenum 108 may define a region of the rotary machine 100 that includes a relatively higher-pressure fluid volume. The outlet plenum 110 may define a region of the rotary machine 100 that includes a relatively lower-pressure fluid volume. The seal assembly 302 may have an annular configuration. In some embodiments, the seal assembly 302 may include a plurality of annular elements that may be assembled to provide the seal assembly 302. Additionally, or in the alternative, the seal assembly 302 may include a plurality of semi-annular elements that may be assembled to provide the seal assembly 302 that has an annular configuration.

In exemplary embodiments, the seal assembly 302 may be configured as an aspirating seal that provides a non-contacting seal interface that inhibits contact between the stator 106 and the rotor 104. By way of non-limiting example, the seal assembly 302 may include or may be configured as an aspirating radial seal, a fluid bearing, a gas bearing, or the like. During operation, a fluid within the inlet plenum 108 may flow, e.g., aspirate, through one or more pathways of the seal assembly 302 to the outlet plenum 110. The fluid flow may provide for the non-contacting seal interface. In some embodiments, the fluid may include pressurized air, gasses, and/or vapor. In other embodiments, the fluid may include a liquid.

In the illustrated embodiment, the seal assembly 302 includes a carriage assembly 304 carried by the stator 63 and having a seal seat 308 defining a seal cavity 310. The seal assembly 302 can further include a seal body 312 at least partially located within the seal cavity 310. One or more seal faces 314 and a pivot connection 316 can be provided between the seal body 312 and the carriage assembly 304. The seal body 312 can be free to move in the radial direction within the seal cavity 310. The seal assembly 302 can further include aerodynamic lift-generation features (not illustrated) such as, but not limited to, a spiral groove, a Rayleigh pad, or otherwise include a curvature mismatch between the seal body 312 and a radius of the rotor 51. The aerodynamic lift-generation features can generate a film of fluid between the seal body 312 and the rotor 51. The film of fluid can generate a lift force between the rotor 51 and the seal body 312 such that seal body 312 can float on the rotor 51 without rubbing, touching, or otherwise contacting the rotor 51. In exemplary embodiments, the seal body 312 defines one or more aspiration conduits 326 configured to supply fluid from the inlet plenum 108 to a primary seal 320. The aspiration conduits 326 may define an internal conduit, pathway, or the like that passes through the seal body 312. The aspiration conduits 126 may fluidly communicate with the inlet plenum 108 and the primary seal 320. The aspiration conduits 326 may discharge fluid from the inlet plenum 108 to the primary seal 320, for example, at a plurality of openings 328 in a seal body face 330.

In exemplary embodiments, one or more flingers 350 are coupled to at least a portion of the seal body 312 to position the one or more flingers 350 between an inlet 352 of the aspiration conduit 326 and the inlet plenum 108. The seal body 312 includes a seal body face 354 defining the inlet 352 and facing upstream toward the airflow 190 flowing within the inlet plenum 108. The flinger 350 defines one or more passageways 360 between the flinger 350 and the seal body face 354, and the flinger 350 defines one or more passageways 366 between the flinger 350 and a portion 364 of the carriage assembly 304. The passageway 360 is fluidly connected to the aspiration conduit 326 and the passageway 362, and the passageway 362 is fluidly connected to the inlet plenum 108. The flinger 350 includes a base member 370 and one or more baffles 372 coupled to the base member 370. However, it should be understood that the base member 370 and the one or more baffles 372 may be configured as a unitary or integral component. The one or more baffles 372 are geometrically configured to direct at least a portion of the airflow 190 radially outward in a direction 374. In the illustrated embodiment, the baffle 372 is wedge-shaped or ramp-shaped such that, similar to the baffles 156 (FIG. 2), at least a portion of the baffle 372 changes a direction of the airflow 190 flowing within the inlet plenum 108. As depicted in FIG. 6, the direction 374 includes a radial directional component and an axial directional component such that at least a portion of the airflow 190 is deflected by the baffle 372 radially outward and, in this embodiment, in an upstream direction. In exemplary embodiments, the flinger 350 reduces or substantially prevents dust and other particulate matter from entering and potentially clogging the aspiration conduits 326. In operation, the baffles 372 cause a directional change of the airflow 190 radially outward away from the passageways 362 such that a flow velocity of the airflow 190 causes dust or other particulate matter to be directed away from the passageways 362 due to the mass of the dust or other particulate matter.

In the illustrated embodiment, at least a portion of the airflow 190 enters the passageway 362 in a direction 380. The airflow 190 exits the passageway 362 and enters the passageway 360 flowing in a direction 382. The airflow exits the passageway 362 and enters the inlet 352 flowing in a direction 384. In exemplary embodiments, an angular difference between the direction 380 and the direction 382 is at least 90°, and an angular difference between the direction 382 and the direction 384 is at least 90°. Thus, in exemplary embodiments, the flinger 350 causes the airflow 190 to undergo a total of at least 180° of directional change between the inlet plenum 108 and the aspiration conduits 326.

The one or more flingers 350 and/or the one or more baffles 372 may have an annular configuration. Additionally, or in the alternative, the flingers 350 and/or the one or more baffles 372 may include a plurality of semi-annular elements that may be assembled to provide an annular assembly. In exemplary embodiments, at least a portion 386 of the baffle 372 is disposed at an angle 388 that is at least 2° with respect to the radial direction. In exemplary embodiments, at least the portion 386 of the baffle 372 is disposed at the angle 388 that is in a range from about 2° to about 100 with respect to the radial direction. In the illustrated embodiment, the portion 386 is depicted as having a planar geometry; however, it should be understood that, additionally or alternatively, the portion 386 may have one or more curved geometries alone or in combination with a planar geometry. Additionally, although FIG. 6 depicts the portion 386 as being a planar surface having a constant axial position as the planar surface extends circumferentially (e.g., in-and-out of the page), it should be understood that the portion 386 may be angularly positioned such that that a position of the planar surface changes axially as the planar surface extends circumferentially. In other words, the portion 386 be oriented at an angle to generate a circumferential swirl of the airflow 190.

Thus, embodiments of the present disclosure include one or more flingers located with respect to the aspiration conduits of an aspirating seal to prevent dust and other particulate matter from entering and/or clogging the aspiration conduits. Embodiments of the present disclosure enable tighter interface gaps at the interface of the rotor and the stator and smaller aspiration conduits to control the fluid provided to the primary seal area. The flingers may include one or more baffles that direct at least a portion of an airflow feeding the aspiration conduits away from the aspiration conduits such that the redirected airflow carries the dust and particulate matter away from the aspiration conduit due the mass of the dust or particulate matter. In exemplary embodiments, the flinger is configured to cause multiple airflow direction changes before the airflow reaches an entry into the aspiration conduit. In other words, the flinger creates or forms a labyrinth or tortuous path for the airflow before reaching an inlet to the aspiration conduit. Additionally, the flinger also functions as a heat shield to protect the seal assembly from thermal radiation which enables the seal assembly to operate at lower operating gaps between stationary and rotating components due to less distortion of the seal assembly that may result from thermal radiation exposure.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a compressor section and a turbine section in axial flow arrangement defining an axially extending, longitudinal centerline, and arranged as a rotor and a stator; a seal assembly defining a primary seal at an interface of the rotor and the stator, the seal assembly separating an inlet plenum from an outlet plenum, the seal assembly comprising one or more aspiration conduits fluidly connected to the primary seal; and one or more flingers positioned at least partially between the seal assembly and the inlet plenum, the one or more flingers defining one or more passageways fluidly connecting the inlet plenum to the one or more aspiration conduits, the one or more flingers positioned to direct at least a portion of an airflow within the inlet plenum away from the one or more passageways.

The gas turbine engine of the preceding clause, wherein the one or more flingers are positioned to direct at least the portion of the airflow radially outward with respect to the one or more passageways.

The gas turbine engine of any preceding clause, wherein the one or more flingers are coupled to the seal assembly.

The gas turbine engine of any preceding clause, wherein the one or more passageways comprise one or more first passageways and one or more second passageways, wherein the one or more first passageways define an axial airflow direction with respect to the one or more aspiration conduits, and wherein the one or more second passageways define a radial airflow direction with respect to the one or more aspiration conduits.

The gas turbine engine of any preceding clause, wherein the one or more flingers extend axially with respect to the inlet plenum.

The gas turbine engine of any preceding clause, wherein the one or more flingers comprise at least one portion angled radially outward with respect to the inlet plenum.

The gas turbine engine of any preceding clause, wherein the one or more flingers comprise one or more baffles.

The gas turbine engine of any preceding clause, wherein the one or more flingers comprise at least one wedge-shaped baffle.

The gas turbine engine of any preceding clause, wherein at least one flinger of the one or more flingers comprises at least one surface defining a radially inward boundary of the inlet plenum, and wherein the at least one flinger of the one or more flingers comprise: a first portion having a first end coupled to the at least one surface and a second end disposed radially outward from the at least one surface; and a second portion extending from the at least one surface to the second end.

The gas turbine engine of any preceding clause, wherein the one or more flingers comprise a first baffle and a second baffle, wherein the first baffle is axially spaced apart from the second baffle.

The gas turbine engine of any preceding clause, wherein the one or more flingers comprise a first baffle and a second baffle, wherein the first baffle is circumferentially spaced apart from the second baffle.

The gas turbine engine of any preceding clause, wherein at least one flinger of the one or more flingers is positioned to direct the airflow within the inlet plenum circumferentially with respect to the one or more passageways.

The gas turbine engine of any preceding clause, wherein the seal assembly comprises at least one of a floating face seal assembly or a floating radial seal assembly.

The gas turbine engine of any preceding clause, wherein at least one flinger of the one or more flingers comprises a first end coupled to the seal assembly and a second end spaced apart from the seal assembly.

The gas turbine engine of any preceding clause, wherein at least inlet of at least one passageway of the one or more passageways is defined between the second end and the seal assembly.

The gas turbine engine of any preceding clause, wherein the at least one flinger comprises at least one baffle positioned at the second end.

The gas turbine engine of any preceding clause, wherein at least one flinger of the one or more flingers comprises one or more tabs extending radially inward toward the seal assembly.

The gas turbine engine of any preceding clause, wherein at least one tab of the one or more tabs is disposed within at least one passageway of the one or more passageways.

The gas turbine engine of any preceding clause, wherein the one or more tabs comprises a first tab and a second tab, wherein the first tab is axially spaced apart from the second tab.

The gas turbine engine of any preceding clause, wherein at least a portion of at least one flinger of the one or more flingers directs at least a portion of the airflow in a forward direction.

The gas turbine engine of any preceding clause, wherein at least a portion of at least one flinger of the one or more flingers extends axially and circumferentially with respect to the seal assembly to at least partially prevent exposure of the primary seal from being exposed to radiant thermal energy emitted by the rotor.

The gas turbine engine of any preceding clause, wherein at least one flinger of the one or more flingers comprises at least one baffle disposed axially forward of at least one aspiration conduit of the one or more aspiration conduits.

The gas turbine engine of any preceding clause, wherein at least one flinger of the one or more flingers comprises at least one baffle disposed axially forward of at least one passageway of the one or more passageways.

The gas turbine engine of any preceding clause, wherein at least one flinger of the one or more flingers extends circumferentially about an entirety of the stator.

The gas turbine engine of any preceding clause, wherein the one or more flingers comprises a plurality of flingers spaced apart from each other circumferentially about the stator.

The gas turbine engine of any preceding clause, wherein at least flinger of the one or more flingers has an annular configuration.

The gas turbine engine of any preceding clause, wherein at least one flinger of the one or more flingers has a semi-annular configuration.

The gas turbine engine of any preceding clause, wherein at least one flinger of the one or more flingers comprises at least one baffle, and wherein at least one passageway of the one or more passageways is disposed radially inward with respect to the at least one baffle.

The gas turbine engine of any preceding clause, wherein at least one flinger of the one or more flingers is configured to cause at least a portion of the airflow to reverse directions before flowing through at least one passageway of the one or more passageways.

A gas turbine engine comprising: a compressor section and a turbine section in axial flow arrangement defining an axially extending, longitudinal centerline, and arranged as a rotor and a stator; a seal assembly defining a primary seal at an interface of the rotor and the stator, the seal assembly separating an inlet plenum from an outlet plenum, the seal assembly comprising one or more aspiration conduits fluidly connected to the primary seal for providing an airflow from the inlet plenum to the primary seal; and one or more flingers positioned at least partially between the seal assembly and the inlet plenum, the one or more flingers defining a first passageway defining a first airflow direction and a second passageway defining a second airflow direction, wherein the second airflow direction is different than the first airflow direction, wherein the first and second passageways are fluidly connected to the inlet plenum and the one or more aspiration conduits.

The gas turbine engine of any preceding clause, wherein the airflow within the inlet plenum is flowing in third airflow direction different than the first airflow direction.

The gas turbine engine of any preceding clause, wherein the one or more flingers include one or more baffles positioned to direct the airflow within the inlet plenum radially outward with respect to the one or more flingers.

The gas turbine engine of any preceding clause, wherein at least one flinger of the one or more flingers comprises a ramp-shaped flinger.

The gas turbine engine of any preceding clause, wherein at least one flinger of the one or more flingers extends an entire circumferential span of the rotor.

The gas turbine engine of any preceding clause, wherein at least one flinger of the one or more flingers extends a circumferential span less than an entire circumferential span of the rotor.

The gas turbine engine of any preceding clause, wherein the first direction is different than the second direction by at least 90°.

The gas turbine engine of any preceding clause, wherein the airflow within the inlet plenum flows in a third direction, and wherein the first direction is different than third direction by at least 90°.

The gas turbine engine of any preceding clause, wherein the seal assembly comprises one or more sliders configured to move axially with respect to the rotor, and wherein the one or more flingers are coupled to the one or more sliders.

The gas turbine engine of any preceding clause, wherein the seal assembly comprises one or more sliders configured to move axially with respect to the rotor, and wherein the one or more flingers a positioned with respect to the one or more sliders to define at least the second passageway.

The gas turbine engine of any preceding clause, wherein the one or more flingers comprise one or more tabs disposed in contact with the one or more sliders.

The gas turbine engine of any preceding clause, wherein the one or more flingers comprise: one or more base members extending axially with respect to the rotor; and one or more tabs extending radially from the one or more base members toward the seal assembly.

The gas turbine engine of any preceding clause, wherein the seal assembly comprises a slider configured to move axially with respect to the rotor, and wherein the one or more tabs are sized or positioned to maintain a uniform spacing between at least a portion of the one or more base members and the one or more sliders.

A gas turbine engine comprising: a compressor section and a turbine section in axial flow arrangement defining an axially extending, longitudinal centerline, and arranged as a rotor and a stator; a seal assembly defining a primary seal at an interface of the rotor and the stator, the seal assembly separating an inlet plenum from an outlet plenum, the seal assembly comprising one or more aspiration conduits fluidly connected to the primary seal for providing an airflow from the inlet plenum to the primary seal; and one or more flingers positioned at least partially between the seal assembly and the inlet plenum, the one or more flingers defining one or more passageways between the seal assembly and the inlet plenum, wherein the one or more passageways are fluidly connected to the inlet plenum, and wherein the one or more flingers comprise one or more baffles configured to cause the airflow flowing within the inlet plenum in a first direction to enter the one or more passageways in a second direction, wherein the second direction is different than the first direction by at least 180°.

A rotary machine, comprising: a stator; a rotor configured to rotate with respect to the stator; a seal assembly at an interface of the rotor with the stator, the seal assembly separating an inlet plenum from an outlet plenum and defining a primary seal between the stator and the rotor, the seal assembly comprising one or more aspiration conduits fluidly connected to the primary seal; and one or more flingers positioned at least partially between the seal assembly and the inlet plenum, the one or more flingers comprising one or more baffles positioned to direct an airflow within the inlet plenum radially outward with respect to the one or more aspiration conduits.

We claim:

1. A gas turbine engine comprising:

a compressor section and a turbine section in axial flow arrangement defining an axially extending, longitudinal centerline, and arranged as a rotor and a stator;

a seal assembly defining a primary seal at an interface of the rotor and the stator, the seal assembly separating an inlet plenum from an outlet plenum, the seal assembly comprising one or more aspiration conduits fluidly connected to the primary seal; and one or more flingers positioned at least partially between the seal assembly and the inlet plenum, the one or more flingers defining one or more passageways fluidly connecting the inlet plenum to the one or more aspiration conduits, the one or more flingers positioned to direct at least a portion of an airflow within the inlet plenum away from the one or more passageways.

2. The gas turbine engine of claim 1, wherein the one or more flingers are coupled to the seal assembly.

3. The gas turbine engine of claim 1, wherein the one or more passageways comprise one or more first passageways and one or more second passageways, wherein the one or more first passageways define an axial airflow direction with respect to the one or more aspiration conduits, and wherein the one or more second passageways define a radial airflow direction with respect to the one or more aspiration conduits.

4. The gas turbine engine of claim 1, wherein the one or more flingers extend axially with respect to the inlet plenum.

5. The gas turbine engine of claim 1, wherein the one or more flingers comprise at least one portion angled radially outward with respect to the inlet plenum.

6. The gas turbine engine of claim 1, wherein the one or more flingers comprise at least one wedge-shaped baffle.

7. The gas turbine engine of claim 1, wherein at least one flinger of the one or more flingers comprises at least one surface defining a radially inward boundary of the inlet plenum, and wherein the at least one flinger of the one or more flingers comprise:

a first portion having a first end coupled to the at least one surface and a second end disposed radially outward from the first end; and a second portion extending from the at least one surface to the second end.

8. The gas turbine engine of claim 1, wherein the one or more flingers comprise a first baffle and a second baffle, wherein the first baffle is axially spaced apart from the second baffle.

9. The gas turbine engine of claim 1, wherein the one or more flingers comprise a first baffle and a second baffle, wherein the first baffle is circumferentially spaced apart from the second baffle.

10. The gas turbine engine of claim 1, wherein at least one flinger of the one or more flingers is positioned to direct the airflow within the inlet plenum circumferentially with respect to the one or more passageways.

11. The gas turbine engine of claim 1, wherein the seal assembly comprises at least one of a floating face seal assembly or a floating radial seal assembly.

12. The gas turbine engine of claim 1, wherein at least one flinger of the one or more flingers comprises a first end coupled to the seal assembly and a second end spaced apart from the seal assembly.

13. The gas turbine engine of claim 12, wherein at least one inlet of at least one passageway of the one or more passageways is defined between the second end and the seal assembly.

14. The gas turbine engine of claim 12, wherein the at least one flinger of the one or more flingers comprises at least one baffle positioned at the second end.

15. The gas turbine engine of claim 1, wherein at least one flinger of the one or more flingers comprises one or more tabs extending radially inward toward the seal assembly.

16. A gas turbine engine comprising:

a compressor section and a turbine section in axial flow arrangement defining an axially extending, longitudinal centerline, and arranged as a rotor and a stator;

a seal assembly defining a primary seal at an interface of the rotor and the stator, the seal assembly separating an inlet plenum from an outlet plenum, the seal assembly comprising one or more aspiration conduits fluidly connected to the primary seal to provide an airflow from the inlet plenum to the primary seal; and one or more flingers positioned at least partially between the seal assembly and the inlet plenum, the one or more flingers defining a first passageway defining a first airflow direction and a second passageway defining a second airflow direction, wherein the second airflow direction is different than the first airflow direction, wherein the first and second passageways are fluidly connected to the inlet plenum and the one or more aspiration conduits.

17. The gas turbine engine of claim 16, wherein the airflow within the inlet plenum is flowing in a third airflow direction different than the first airflow direction.

18. The gas turbine engine of claim 16, wherein the one or more flingers include one or more baffles positioned to direct the airflow within the inlet plenum radially outward with respect to the one or more flingers.

19. The gas turbine engine of claim 18, wherein at least one flinger of the one or more flingers comprises a ramp-shaped flinger.

20. A gas turbine engine comprising:

a compressor section and a turbine section in axial flow arrangement defining an axially extending, longitudinal centerline, and arranged as a rotor and a stator;

a seal assembly defining a primary seal at an interface of the rotor and the stator, the seal assembly separating an inlet plenum from an outlet plenum, the seal assembly comprising one or more aspiration conduits fluidly connected to the primary seal to provide an airflow from the inlet plenum to the primary seal; and one or more flingers positioned at least partially between the seal assembly and the inlet plenum, the one or more flingers defining one or more passageways between the seal assembly and the inlet plenum, wherein the one or more passageways are fluidly connected to the inlet plenum, and wherein the one or more flingers comprise one or more baffles configured to cause the airflow flowing within the inlet plenum in a first direction to enter the one or more passageways in a second direction, wherein the second direction is different than the first direction by at least 180°.

* * * * *